United States Patent [19]
Gephardt et al.

[11] Patent Number: 5,778,236
[45] Date of Patent: Jul. 7, 1998

[54] MULTIPROCESSING INTERRUPT CONTROLLER ON I/O BUS

[75] Inventors: Douglas D. Gephardt; Rodney W. Schmidt, both of Austin, Tex.

[73] Assignee: Advanced Micro Devices, Inc., Sunnyvale, Calif.

[21] Appl. No.: 649,787

[22] Filed: May 17, 1996

[51] Int. Cl.⁶ .................................................... G06F 3/00
[52] U.S. Cl. .............................................. 395/739; 395/308
[58] Field of Search ........................... 395/733–742, 395/308, 739

[56] References Cited

U.S. PATENT DOCUMENTS

| | | |
|---|---|---|
| 4,271,468 | 6/1981 | Christensen et al. |
| 4,495,569 | 1/1985 | Kagawa. |
| 4,862,354 | 8/1989 | Fiacconi et al. |
| 4,967,342 | 10/1990 | Lent et al. |
| 5,099,414 | 3/1992 | Cole et al. |
| 5,125,093 | 6/1992 | McFarland. |
| 5,283,904 | 2/1994 | Carson et al. ............... 395/725 |
| 5,317,747 | 5/1994 | Mochida et al. |
| 5,481,725 | 1/1996 | Jayakumar et al. ......... 395/725 |
| 5,506,997 | 4/1996 | Maguire et al. |
| 5,535,341 | 7/1996 | Shah et al. ................. 395/306 |
| 5,555,430 | 9/1996 | Gephardt et al. |
| 5,590,338 | 12/1996 | Parks et al. ................ 395/742 |
| 5,613,128 | 3/1997 | Nizar et al. ................ 395/735 |
| 5,619,706 | 4/1997 | Young ........................ 395/741 |
| 5,623,674 | 4/1997 | Pedrizetti ................... 395/733 |
| 5,627,962 | 5/1997 | Goodrum et al. ............ 395/182.11 |

FOREIGN PATENT DOCUMENTS

| | | |
|---|---|---|
| 0 535 821 A1 | 4/1993 | European Pat. Off. |
| 94/08300 | 4/1994 | WIPO. |
| 94/08313 | 4/1994 | WIPO. |

OTHER PUBLICATIONS

Intel MultiProcessor Specification, Version 1.1, Apr. 1994, pp. i–vi; 1–1–5–6;A–1–C–1; Glossary 1–2.
Russo, Andrew P., "The AlphaServer 2100 I/O Subsystem," Digital Technical Journal, vol. 6, No. 3, Summer 1994, pp. 20–28.

*Primary Examiner*—Jack B. Harvey
*Assistant Examiner*—David A. Wiley
*Attorney, Agent, or Firm*—Conley, Rose & Tayon; B. Noel Kivlin

[57] ABSTRACT

A multiprocessing computer system which includes an interrupt controller coupled to an expansion bus. The programmable interrupt controller has multiple storage locations at the same address for multiple CPUs. The CPUs are coupled to a host bus which in turn is coupled to the expansion bus by means of a bus bridge. An arbiter is coupled to the host bus for arbitrating bus mastership amongst the CPUs. CPU host owner identification for access to the storage locations is transferred across bus bridge to the programmable interrupt controller synchronized with the buffered address and data.

7 Claims, 7 Drawing Sheets

| Status | Vector | Priority | Destination | Mask | Affinity | Type | Enabled |

Exemplary Interrupt Field

FIG. 7

MULTIPROCESSING INTERRUPT CONTROLLER ON I/O BUS

BACKGROUND OF THE INVENTION

1. Field of the Invention

This invention relates to computer systems, and more particularly, to interrupt control architectures and schemes employed within symmetrical multiprocessing systems.

2. Description of the Relevant Art

A typical computer system contains at least one interrupt service provider (ISP), usually a central processing unit (CPU), and a number of input/output (I/O) devices peripheral to the CPU(s). These I/O devices commonly include hard disk drives, floppy drives, video adapters, parallel ports, serial ports, and other similar I/O type devices. An I/O device may need to alert the CPU(s) or request service when it completes a task or has a status change, such as finishing a data transfer, completing an operation, receiving data, or the occurrence of an error condition.

The typical mechanism for an I/O device to request service from the CPU(s) involves an interrupt request. An interrupt request is generally a hardware signal sent from the requesting device to a CPU notifying the CPU that the I/O device requires service. Other system devices such as timers, direct memory access (DMA) controllers, and other processors may generate interrupt request signals.

One advantage of using interrupts over other techniques, such as polling, is that the CPU is free to perform other operations between interrupts. When a CPU receives an interrupt request, it stops executing the current instruction routine, saves its state, and jumps to an interrupt service routine. The interrupt service routine includes instructions specific to the device requesting the interrupt so that the CPU can respond to the device condition or status change that instigated the interrupt request. When the interrupt service routine is completed, the CPU restores its state and returns to its location prior to the interrupt.

Referring to FIG. 1, a computer system 100 using interrupts is shown according to the prior art. The computer system 100 includes a CPU 110, and a main memory system 120 coupled to a host bus 180. The main memory system 120 typically includes a memory controller and system memory (not shown). A bus bridge 140 is coupled to the host bus 180 and a expansion bus 190 and typically includes a DMA controller (not shown). The expansion bus 190 typically conforms to a popular bus standard such as the Industry Standard Architecture (ISA), Extended Industry Architecture (EISA), Microchannel Architecture (MCA), or Peripheral Component Interconnect (PCI). Alternatively, multiple expansion buses are included, such as a PCI bus further coupled to an ISA bus. Several I/O devices 150, 160, 170 are coupled to the expansion bus 190. The I/O devices 150, 160, 170 are typically devices such as a floppy disk drive, video adapter, parallel port, or other devices as are well known in the art.

The bus bridge 140 and the I/O devices 150, 160, 170 generate interrupt requests along interrupt request lines 142, 152, 162, 172, respectively, to notify the CPU 110 that service is needed. The interrupt requests along lines 142, 152, 162, 172 are collected by a programmable interrupt controller (PIC) 130. Generally, when the programmable interrupt controller 130 receives one of the interrupt requests along lines 142, 152, 162, 172 it sends an interrupt signal on line 132 to the CPU 110. When the CPU 110 receives the interrupt signal on line 132, it finishes its current operation and sends an interrupt acknowledge along line 112 to the programmable interrupt controller 130. When the programmable interrupt controller 130 receives the interrupt acknowledge it sends an interrupt vector to the CPU 110 over the host bus 180. The interrupt vector indicates the location of the appropriate interrupt service routine to the CPU 110.

Generally speaking, in a typical system, a programmable interrupt controller receives the interrupt request signals from the various system devices and organizes the requests to be sent to the CPU(s). Normally, the programmable interrupt controller includes a mask register associated with each interrupt. The mask register is programmed to block a certain interrupt so that the CPU will not be interrupted by that particular interrupt. The programmable interrupt controller contains other registers associated with each interrupt for indicating information such as the interrupt status and interrupt vector for each interrupt.

Referring now to FIG. 2, a multi-processing computer system 10 is shown according to the prior art. The computer system 10 includes multiple CPUs 16a, 16b, 16c and a memory system 18 coupled to a host bus 12. A bus bridge 24 couples the host bus 12 to an expansion bus 14. Multiple I/O devices 26a, 26b and 26c are coupled to the expansion bus 14. An interrupt controller 20 is coupled to the host bus 12. Also coupled to the host bus 12 is a bus arbiter 22. Bus arbiter 22 performs bus arbitration amongst the various bus masters, which can include any of the CPUs 16a, 16b and 16c. Interrupt controller 20 operates in a manner similar to that discussed above, except that it also must distinguish between interrupts that must be executed by each of the CPUs 16a, 16b and 16c.

Typically, an interrupt controller in a multi-processing system has registers or other memory units 17 for each CPU at a common address. Thus, in the system shown in FIG. 3, for example, the task priority registers, for each CPU are mapped at the same address for all CPUs so that software can be written independently of the CPU. By way of similar example, control registers and interprocessor interrupt registers may also be mapped at the same address for each CPU. However, the interrupt controller must still know which register or memory unit or location is being accessed. Accordingly, arbiter 22 is coupled to interrupt controller 20. Arbiter 22 provides to interrupt controller 20 an identification of the bus owner CPU. This information is used by the interrupt controller to determine which set of unique commonly addressed registers or memory units is to be accessed.

To provide for greater flexibility, it is desirable to move the interrupt controller from the host bus to the expansion bus. However, expansion buses do not provide bus owner identification as does the host bus. Moreover, depending on the expansion bus, a bus bridge may buffer multiple writes from a particular host to the same target. To the host, the writes appear to have been completed. The bus bridge may then transfer the data to the I/O device. Because of the buffering and added wait states that are not apparent to the host, the owner identification will be gone from the host bus long before the data is written to or read from the peripheral device. Even when there is no buffering, the owner identification may be gone before the data is transferred out.

SUMMARY OF THE INVENTION

The present invention provides a computer system including one or more CPUs in which a programmable interrupt controller is coupled to an expansion bus. The CPUs and a memory system are coupled to a host bus. A bus bridge device couples the host bus to the expansion bus. At least one I/O device is coupled to the expansion bus and generates interrupt requests. The computer system also includes an arbiter coupled to the host bus. The bus bridge is configured such that the bus owner identification received from the arbiter is associated with each data cycle. The bus owner identification is provided across the bridge to the interrupt controller. In this fashion, the programmable interrupt controller can maintain storage units at common addresses, thereby maintaining a relatively simple yet flexible configuration.

In one embodiment of the present invention, a bus bridge is configured to buffer data from multiple writes from a particular host to the same target, and is further configured to transfer the data as a burst. Bus owner identification is provided to the bridge and associated with the data for an interrupt controller such that it is trusted to the interrupt controller such that the appropriate memory location may be accessed.

Broadly speaking, the present invention contemplates a multiprocessing computer system which includes an interrupt controller coupled to an expansion bus. The programmable interrupt controller has multiple storage units at the same address for multiple CPUs. The CPUs are coupled to a host bus which in turn is coupled to the expansion bus by means of a bus bridge. An arbiter is coupled to the host bus for arbitrating bus mastership amongst the CPUs. CPU host owner identification is transferred across bus bridge to the programmable interrupt controller synchronized with address and data.

BRIEF DESCRIPTION OF THE DRAWINGS

A better understanding of the present invention can be obtained when the following detailed description of the preferred embodiment is considered in conjunction with the following drawings, in which:

FIG. 7 illustrates an exemplary information field according to one embodiment of the present invention.

Figure 1:
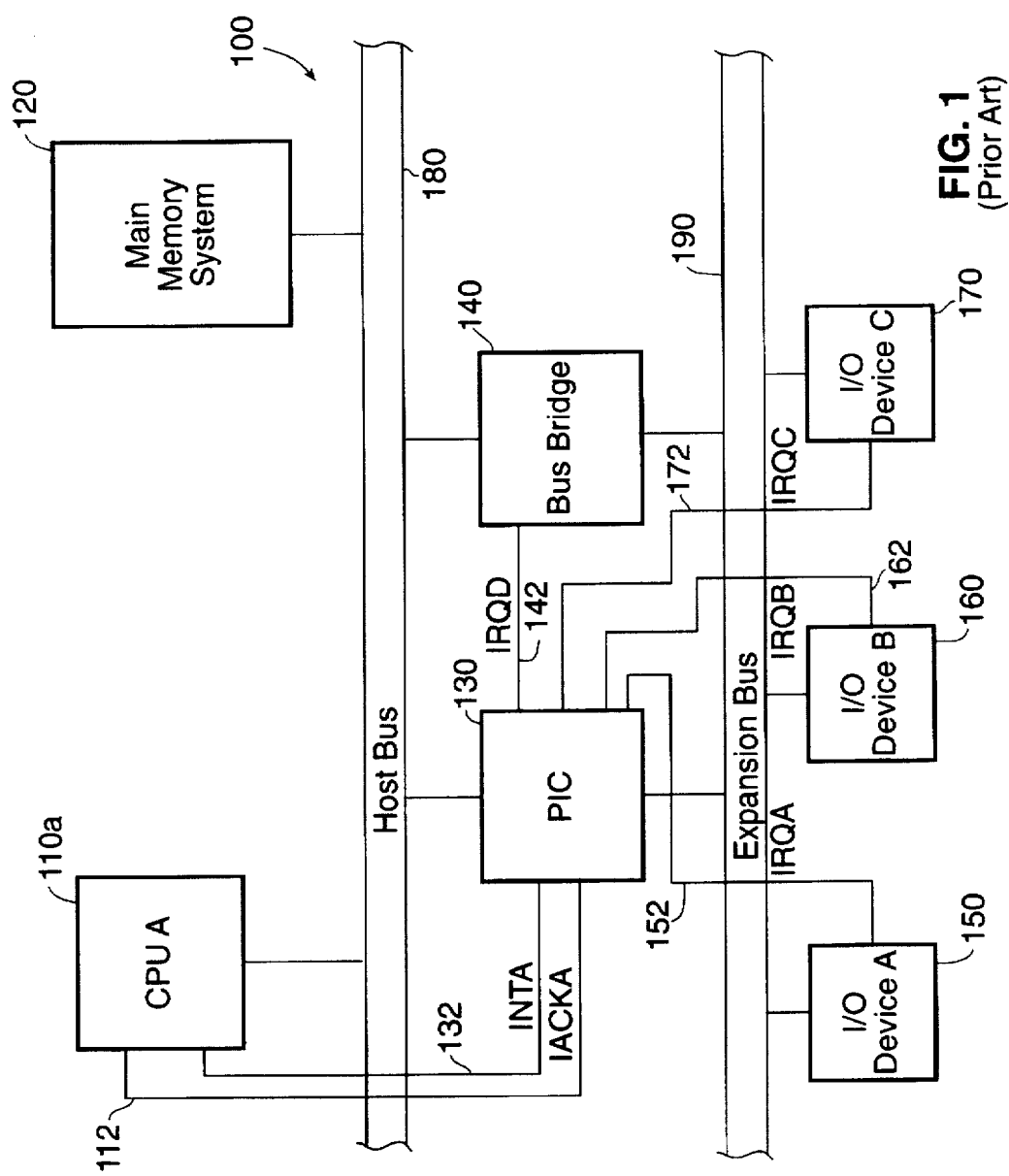
FIG. 1 is a block diagram illustrating a computer system with a programmable interrupt controller according to the prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 3:
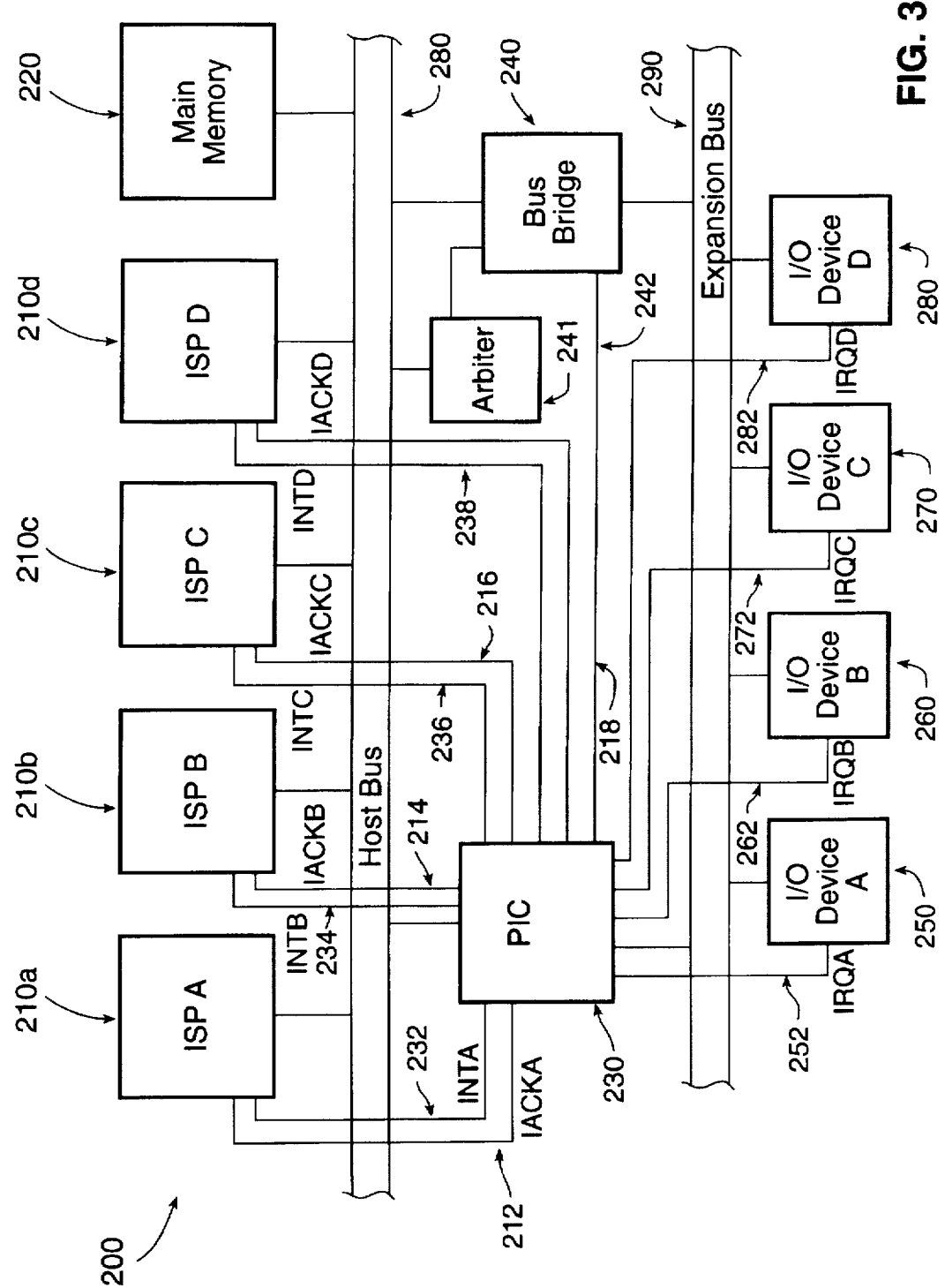
FIG. 3 is a block diagram illustrating a computer system with a programmable interrupt controller according to one embodiment of the present invention.

Referring back to the drawings, FIG. 3 is a block diagram of a computer system 200 including a programmable interrupt controller 230 having commonly addressable storage location 217 according to one embodiment of the present invention. The computer system includes interrupt service providers (ISPs) 210a, 210b, 210c, and 210d, each coupled to a host bus 280, and a main memory system 220 coupled to the host bus 280. The ISPs may be central processing units (CPUs). The CPUs may be compatible with any of a number of instruction sets, including the 486, PowerPC and Pentium instruction sets. The main memory system 220 includes a memory controller and system memory (not shown). An arbiter 241 is coupled to the host bus 280 for arbitrating bus mastership among the ISPs 210a, 210b, 210c, 210d. A bus bridge 240 is coupled to the host bus 280 and an expansion bus 290. The expansion bus 290 conforms to a popular bus standard such as the Industry Standard Architecture (ISA), Extended Industry Standard Architecture (EISA), Microchannel Architecture (MCA), or Peripheral Component Interconnect (PCI). In other embodiments of the computer system, multiple expansion buses are included, such as a PCI bus further coupled to an ISA bus. Several I/O devices 250, 260, 270, 280 are coupled to the expansion bus 290. The I/O devices 250, 260, 270, 280 are typically devices such as a floppy disk drive, video adapter, parallel port, or other devices as are well known in the art. It should be noted that in other embodiments, the number of processors and I/O devices are not necessarily equal. In other embodiments, different types and different numbers of I/O devices may be present.

Figure 4:
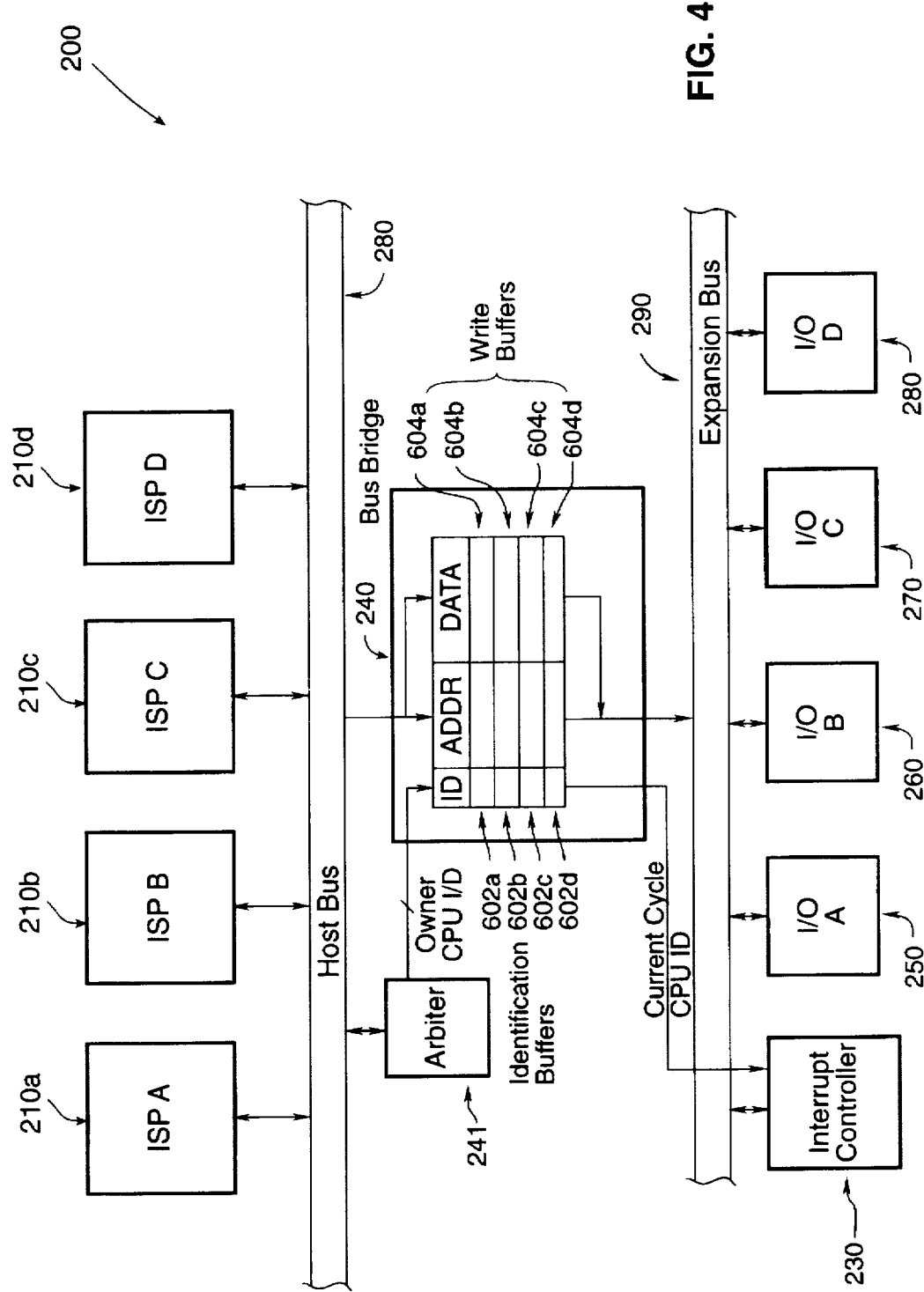
FIG. 4 is a more detailed diagram of the computer system shown in FIG. 3.

Turning now to FIG. 4, a more detailed diagram of the bus bridge 240 of the computer system 200 of FIG. 3 is shown. Common programmable interrupt controller 230 includes commonly addressable storage units or locations 217. Components common to both figures reference numerals. Bus bridge 240 can include bus cycle buffers 604a, 604b, 604c and 604d. It should be noted that the illustrated four write buffers are exemplary only. More, fewer, or even none are contemplated in alternate embodiments. In a typical bus cycle from an ISP 210a, 210b, 210c, 210d to the programmable interrupt controller 230, write cycles are collected, then buffered in bus cycle buffers 604a, 604b, 604c and 604d. In a write operation from an ISP to the interrupt controller, the write information is then transferred out to the programmable interrupt controller 230. However, in a typical system, the host bus owner identification which typically accompanies a transfer along host bus 280 is lost, since expansion bus 290 does not accommodate host identification. However, according to the present invention, a signal indicative of bus mastership is provided during the transfer of a designated bus cycle. The signal is provided from the arbiter to the bus bridge and may be matched with the address of the bus cycle. If the address corresponds to a location mapped among separate storage units, the arbiter signal may be used to determine which is being accessed.

As discussed above, such storage units or locations can include task priority registers or units, and various other interrupt control registers. Task priority registers are used, for example, in determining to which CPU an interrupt should be assigned. Typically, it is assigned to the CPU according to the priority of the task being executed. Other commonly mapped locations can include those for current interrupt identification, processor identification and interprocessors and software interrupt controls. In one embodiment, bus bridge 240 can include buffers for collecting bus cycles from one bus in order to burst transfer them along the other. In that embodiment of the present system, arbiter 241 provides an owner identification to bus bridge 240, which associates the owner identification with the appropriate write buffers 604a, 604b, 604c and 604d in identification buffers 602a, 602b, 602c and 602d. When data in write buffers 604a, 604b, 604c and 604d is bursted or otherwise transferred out, the contents of the corresponding identification buffer 602a, 602b, 602c and 602d are written to interrupt controller 230.

The bus bridge 240 and the I/O devices 250, 260, 270 generate interrupt requests 242, 252, 262, 272, respectively, to notify one of the ISPs 210a, 210b, 210c, 210d that service is needed. The interrupt requests 242, 252, 262, 272 are collected by a programmable interrupt controller (PIC) 230. The programmable interrupt controller 230 is coupled to the expansion bus 290. It should be noted that programmable interrupt controller 230 may be coupled to host bus 280. When the programmable interrupt controller 230 receives one of the interrupt requests 242, 252, 262, 272 it determines whether or not to send an ISP interrupt signal 232, 234, 236, 238 to one of the ISPs 210a, 210b, 210c. Additionally, the programmable interrupt controller 230 receives interrupt acknowledge signals 212, 214, 216, 218 from the ISPs 210a, 210b, 210c, 210d, respectively. The programmable interrupt controller 230 may provide a interrupt vector to one of the ISPs 210a, 210b, 210c, 210d over the host bus 280. The interrupt vector indicates the location in memory of an interrupt service routine for handling the event that initiated the corresponding interrupt request. The programmable interrupt controller 230 is responsible for other interrupt management tasks as well. A more detailed description is given below for one embodiment of the programmable interrupt controller 230.

Figure 5:
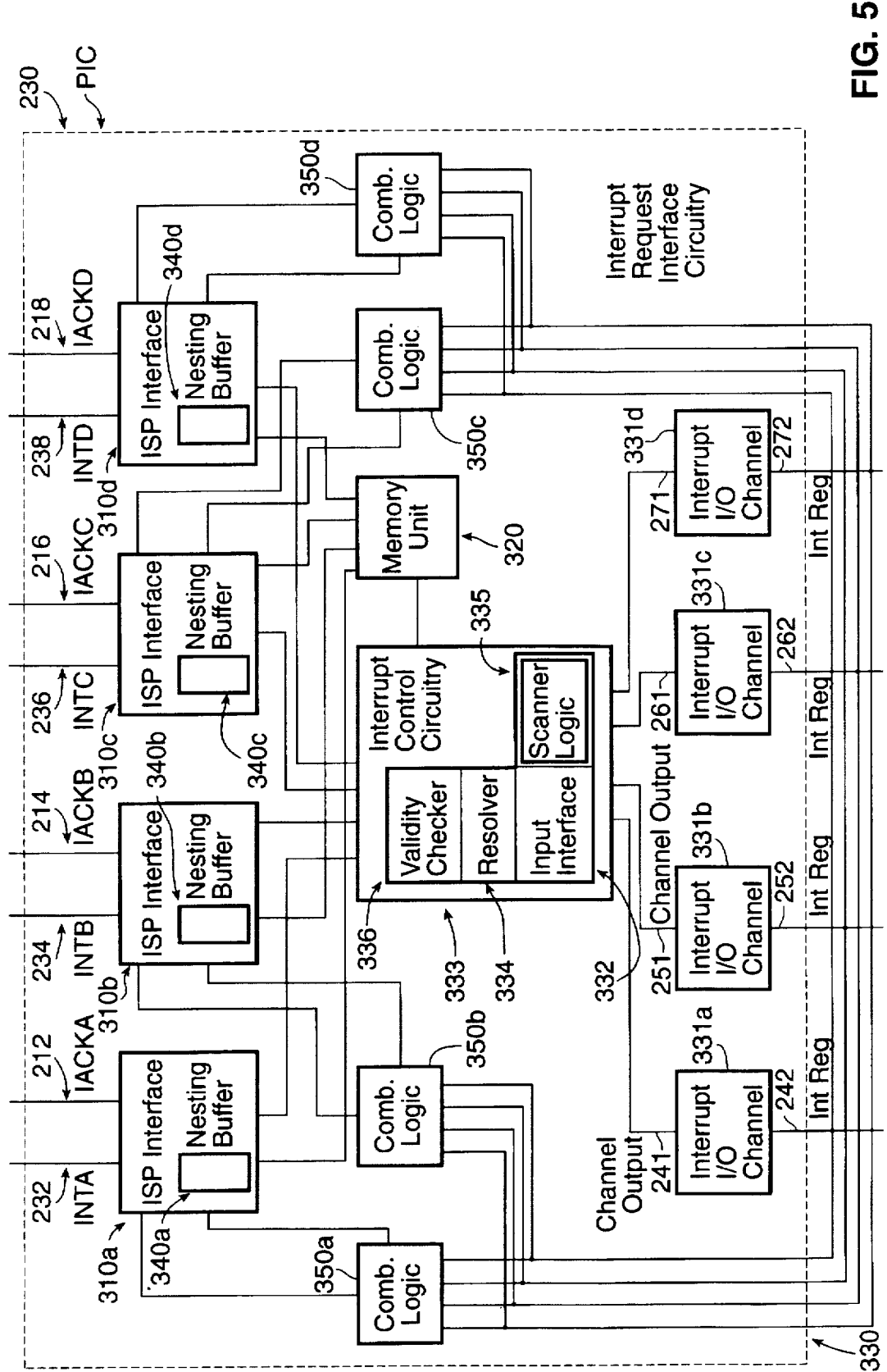
FIG. 5 is a block diagram of the programmable interrupt controller according to one embodiment of the present invention.

Referring now to FIG. 5, a block diagram is shown illustrating one embodiment of the programmable interrupt controller 230. The programmable interrupt controller 230 includes interrupt request interface circuitry 330 coupled to interrupt control circuitry 333. Interrupt request interface circuitry comprises a plurality of interrupt I/O channels 331a, 331b, 331c, and 331d corresponding to interrupt request lines 242, 252, 262, and 272. Interrupt control circuitry 333 includes an input interface 332, a resolver 334, and a validity checker 336. Central interrupt control circuit 333 is further coupled to a plurality of ISP interface channels 310a, 310b, 310c, and 310d. Each ISP interface channel 310a, 310b, 310c, 310d includes a nesting buffer 340a, 340b, 320c, and 340d, respectively, for storing interrupt requests. The interrupt request lines 242, 252, 262, and 272 are each coupled to the inputs of combinatorial logic units 350a, 350b, 350c, 350d. The outputs and control lines of combinatorial logic units 350a, 350b, 350c and 350d are, in turn, coupled to ISP interface channels 310a, 310b, 310c, and 310d, respectively. Finally, central control circuit 333 and ISP interface channels 310a, 310b, 310c, and 310d are each coupled to memory unit 320.

The interrupt request interface circuitry 330 receives the interrupt requests from the I/O devices along interrupt request lines 242, 252, 262, 272. The ISP interfaces 310a, 310b, 310c, 310d provide the ISP interrupt signals 232, 234, 236, 238, respectively, and receive the interrupt acknowledge signals 212, 214, 216, 218, respectively. Interrupt request interface circuitry 330 comprises a plurality of interrupt I/O channels, 331a, 331b, 331c, and 331d. Each interrupt I/O channel outputs a logical high to central control circuit 333 upon a change of state (i.e., upon receipt or cancellation of an interrupt request). For example, if an edge-triggered interrupt is received on interrupt request line 242, interrupt I/O channel 331a will output a logical high along channel output line 241. Control circuit 333 will then proceed to process the interrupt request by marking the request as active (as will be discussed in more detail below) and cause interrupt I/O channel 331a to deassert the signal at the channel output line 241. Upon reception of the next rising edge, the I/O channel will again output a logical high along channel output line 241. If a level-triggered interrupt is received on interrupt request line 242, interrupt I/O channel 331a will again cause channel output line 241 to be asserted high, causing central control circuit 333 to mark the request as active and process it. Again, the central control circuit 333 causes the interrupt I/O channel 331a to dessert the signal at the output line 241. If interrupt request line 242 goes low, indicating the deassertion of the interrupt, interrupt I/O channel 331a will again assert line channel output 241 high. Central control circuit 333 will note that the interrupt was marked as active and will read the deassertion of the interrupt, clearing the interrupt as will be discussed in more detail below. Central control circuit 333 will again cause the interrupt I/O channel 331a to deassert the signal at output line 241.

Input interface 332 of central control circuit 333 includes scanner logic 335 which scans each channel output 241, 251, 261, and 271 of each interrupt I/O channel 331a, 331b, 331c, and 331d. In one embodiment, scanner logic 335 comprises a state machine which polls each channel output line 241, 251, 261, 271 in round-robin fashion. When an active interrupt request is detected by the input interface 332 on one of the channel output lines 241, 251, 261, 271, the central control circuitry 333 associates a status and a priority level with the interrupt request. This information, as well as other interrupt information, is stored as a field in the programmable interrupt controller 230 for each interrupt request.

In one embodiment, memory unit 320 is a random access memory (RAM), though memory unit 320 may be embodied as dedicated registers. An exemplary field is shown in FIG. 7. The information field includes a state, an interrupt vector, a priority level, a destination, a mask indication, an affinity indication, whether the interrupt is edge or level triggered, and whether the interrupt is enabled or disabled. The state may indicate if the interrupt request is active, idle, in-service, or pending. The interrupt vector indicates the location of an interrupt service routine in main memory for a CPU to execute in order to handle the situation which initiated the interrupt request. The priority level is used to decide which interrupt requests are issued to a CPU first. The destination information may be used to specify to which ISP an interrupt request should be issued. The mask indication may be used to block a particular interrupt request from issuing to an ISP. The affinity indicator may show which ISP most recently executed the interrupt and may be used in conjunction with the destination information to determine which processor should receive the interrupt.

The central interrupt control circuitry 333 accesses the information stored in the memory unit 320 by generating read cycles to the memory unit 320 and by means of a unique interrupt identification code assigned to each interrupt request. For the currently selected interrupt request, the central interrupt control circuitry 333 reads the 25 associated information field from the memory unit 320. Based on the current state of the input (242, 252, 262, or 272) for the currently selected interrupt request and associated information read from the memory unit 320, the central interrupt control logic 333 determines the next state for the selected interrupt request. The next state is then stored in the memory unit 320. The mask, priority level, and previous state information may be used by the central interrupt control logic 333 to determine the next state for the selected interrupt request.

The next state may indicate if the interrupt request is valid, idle, inservice, or pending.

The central interrupt control circuitry 333 accesses the associated information in the memory unit 320 for the current interrupt request, and resolver 334 determines, according to the destination and affinity information, to which ISP interface 310a, 310b, 310c, or 310d the interrupt is to be sent. A particular ISP may be specified, or the interrupt may be sent to an ISP based on which one serviced it most recently (and hence might still have its service routine stored in cache).

Figure 6:
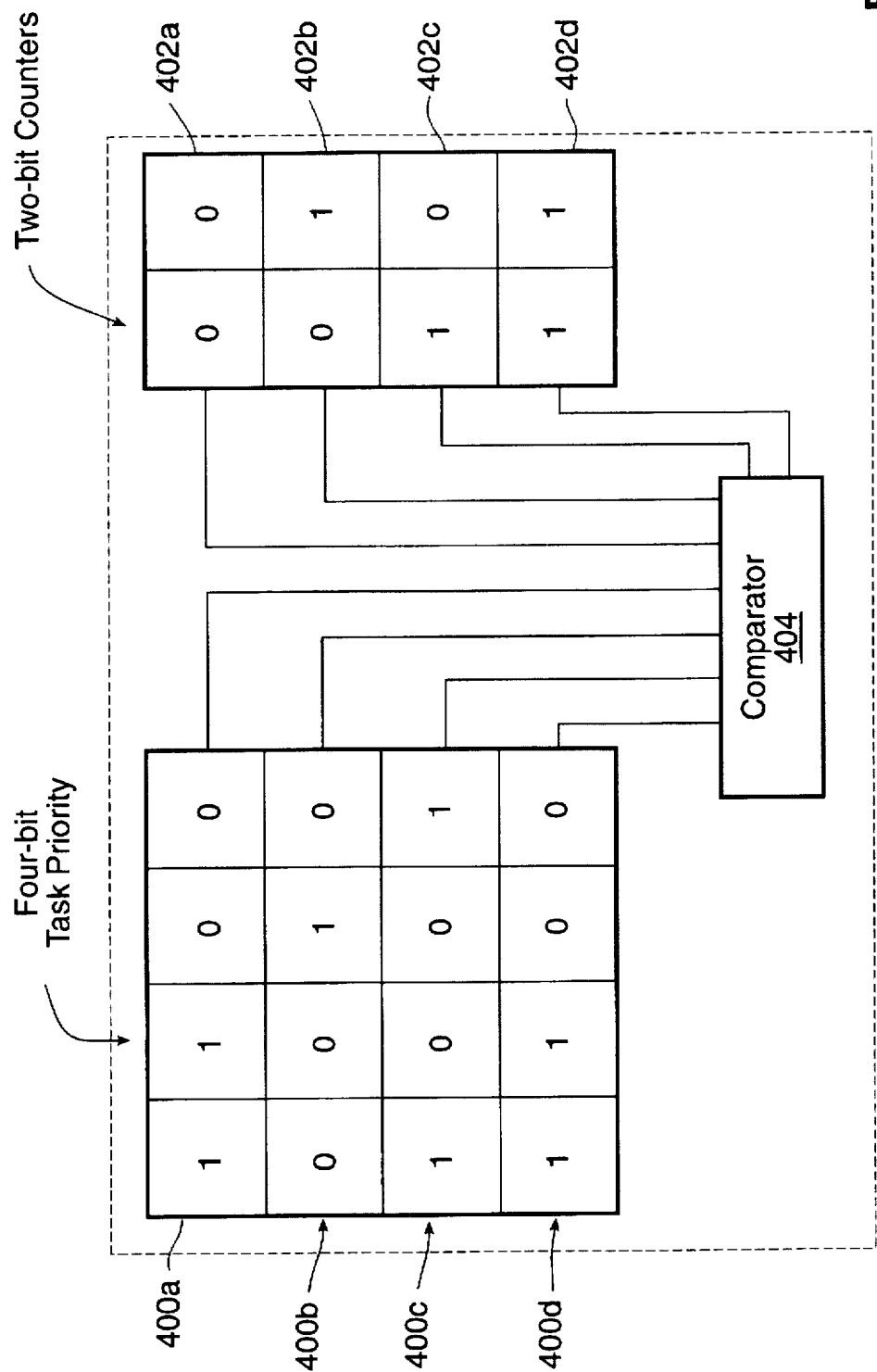
FIG. 6 illustrates a task priority resolution scheme according to one embodiment of the present invention.

In one embodiment, the interrupt is also routed to the ISP based on a task priority, indicating which ISP is executing the lowest priority task. The interrupt is routed to the ISP having the lowest task priority. For example, FIG. 6 shows a schematic representation of the task priority resolution process. In the exemplary system having four ISPs, the priority level of each device is represented by a four-bit binary number 440a, 400b, 400c, 400d, thereby allowing for sixteen task priority levels. If more than one device shares the same task priority, then the routing is made substantially randomly among the devices sharing the task priority level. This is accomplished through the use of a two-bit field 402a, 402b, 402c, 402d that is appended to the four-bit task priority number. The additional two bits function as the least significant bits in the resulting six-bit number. When the four-bit task priorities are identical, the remaining two bits are used to randomly route the interrupt. A comparator is also provided, to select the smallest six-bit number. For example, 400a and 400d show identical task priorities. Their corresponding two-bit extensions 400a, 402a are different. Accordingly, the comparator 404 will select the device corresponding to 400a and 402a.

So long as the two additional bits 402a, 402b, 402c, 402d are guaranteed to be different, the six-bit priority numbers will be different, even if the original four-bit task priority numbers 400a, 400b, 400c, 400d are the same. To ensure that a different device is selected at the next arbitration, the two-bit numbers 402a, 402b, 402c, 402d are updated after every arbitration. Accordingly, in one embodiment, the two-bit number fields are implemented as two-bit binary counters. The counters are initialized at start-up to ensure that each CPU is assigned a different two-bit number. After every arbitration, each counter is incremented synchronously and wrapped-around, if necessary. This ensures that the counters will always contain different values. It should be noted that on the two-bit number, as well as the four-bit number, may be stored in memory unit 320. Alternatively, the two-and four-bit numbers may be stored in resolver 334.

Once the interrupt has been assigned to a particular ISP, the appropriate ISP interfaces 310a, 310b, 310c, or 310d use the associated information for the current interrupt request to determine if and when to issue the interrupt request to an ISP by driving the corresponding ISP interrupt request 232, 234, 236, or 238 active. The priority level information may be used to determine when the selected interrupt request will issue to a ISP. The appropriate ISP interface 310a, 310b, 310c, or 310d may update the associated information in the memory 320 by accessing the memory unit 320 through the central interrupt control circuitry 333 in response to the appropriate interrupt acknowledge 212, 214, 216, 218 and end of interrupt being received. For example, the state information may be updated to in-service after an interrupt acknowledge is received or to idle after an end of interrupt is received.

Once the interrupt request has been routed to the appropriate ISP interface 310a, 310b, 310c, or 310d, the unique identification code for the current interrupt request is stored in an entry in the interrupt nesting buffer 340a, 340b, 340c, or 340d of the appropriate ISP interface 310a, 310b, 310c, 310d. In one embodiment, nesting buffers 340a, 340b, 340c, 310d need only store the interrupt identification according to priority. The remaining interrupt information may be referenced from memory unit 320. The nesting buffers 340a, 340b, 340c, or 340d each have a number of entries at least equal to the number of different interrupt priority levels. Each entry corresponds to a priority level. The priority level is used to determine when the interrupt request will issue. The highest priority interrupt requests held in each of the ISP interfaces 310a, 310b, 310c, 310d are issued first. Lower priority interrupt requests are held until they become the highest priority interrupt request. If a lower priority interrupt is currently being serviced, the higher priority interrupt will be given to the ISP. The former, lower priority interrupt will resume only after the higher priority interrupt has been completed. Thus, the maximum number of interrupts that may be given to a ISP at a given time is equal to the number of distinct priority levels supported by the system. Consequently, in one embodiment, the nesting buffers 340a, 340b, or 340c each have a number of entries equal to the number of different interrupt priority levels.

Determining when an interrupt request will issue based on priority is also referred to as resolving interrupt priority. The central interrupt control circuitry 333 uses the priority from the corresponding interrupt information to determine in which entry of the nesting buffer 340a, 340b, 340c, 340d the unique interrupt identification code is stored. The entry is marked as busy when a unique interrupt identification code is stored in the entry. Each ISP interface 310a, 310b, 310c, 310d uses the unique interrupt identification code for the highest priority active entry in its respective interrupt nesting buffer 340a, 340b, 340c, 340d to access the corresponding interrupt information from the memory unit 320. In conjunction with validity checker 336, each ISP interface 310a, 310b, 310c, 310d uses the corresponding accessed information to determine if the corresponding interrupt request should be issued. For example, if the interrupt request is determined to be no longer valid, or is masked, the interrupt request may not issue to a CPU. More particularly, an ISP interface 310a, 310b, 310c, 310d may determine to void the corresponding interrupt request if the accessed information indicates that the corresponding interrupt request has become invalid while its unique interrupt identification code was pending in a nesting buffer 340a, 340b, 340c, 340d waiting to become highest priority. This period of waiting is referred to as interrupt latency. This latency may be relatively large, especially for low priority interrupt requests. The validity checker 320 monitors the validity of the interrupt requests stored within the ISP interfaces 310a, 310b, 310c, and 310d. If an interrupt request becomes invalid before it issues, the validity checker 320 indicates an invalid state for the interrupt request to the appropriate ISP interface 310a, 310b, 310c, and 310d to the central interrupt control circuitry 333. Thus, the invalid interrupt request is cleared (canceled) before it needlessly issues. In that case, the interrupt status in memory unit 320 is updated to idle. In one embodiment, the validity checker 336 monitors the condition of each input 241, 251, 261, and 271 to the scanner 335. If one of the interrupt request signals 242, 252, 262, 272 changes from active to inactive before the corresponding interrupt request issues to the ISP, then the validity checker 336 determines the interrupt request to be invalid. It is noted that in other embodiments, different methods and criteria may be used to determine the validity of an interrupt request.

When an interrupt request becomes the highest priority interrupt request in one of the ISP interfaces 310a, 310b, 310c, 310d, the appropriate ISP interface 310a, 310b, 310c, 310d issues the interrupt request to the corresponding ISP by driving active the appropriate ISP interrupt signal 232, 234, 236, 238. The validity checker 336 continues to monitor the validity of the interrupt request as described above. If the validity checker 336 determines that the interrupt request has become invalid before the ISP responds (i.e., by returning the interrupt acknowledge signal), then the interrupt request is cleared as described above and the appropriate ISP interface 310a, 310b, 310c, 310d drives inactive the corresponding ISP interrupt signal 232, 234, 236, or 238. Thus, the ISP may be prevented from needlessly responding to an invalid interrupt request.

If the interrupt request stays valid and an ISP responds by driving one of the interrupt acknowledge signals 212, 214, 216, 218 active, the corresponding ISP interface 310a, 310b, 310c, 310d receives the active interrupt acknowledge signal 212, 214, 216, 218 from the corresponding ISP. Also, the corresponding status entry is marked as in-service. The validity checker continues to monitor the validity of the corresponding interrupt request. If the request is valid at this point, the appropriate ISP interface 310a, 310b, 310c, 310d sends the corresponding interrupt vector over the host bus 280 to the ISP. The ISP executes the interrupt routine indicated by the interrupt vector and returns an end of interrupt (EOI) command to the programmable interrupt controller 230 over the host bus 280. When the appropriate ISP interface 310a, 310b, 310c, 310d receives the EOI command, the interrupt request is cleared. The status for the corresponding interrupt request is then changed to idle to indicate that the corresponding interrupt request signal 242, 252, 262, 272 input is available for a new interrupt request. Finally, the next highest priority interrupt request is processed as described above, the appropriate ISP interface 310a, 310b, 310c, 310d accessing the interrupt information referenced by the unique interrupt identification code from the corresponding entry of the appropriate interrupt nesting buffer 340a, 340b, 340c, 340d.

Because of the interrupt latency problem, it is possible for the interrupt request to become invalid before the appropriate ISP interface 310a, 310b, 310c, 310d is ready to send the corresponding interrupt vector, but after the acknowledge interrupt has been received. More particularly, as discussed above, the validity checker circuit monitors the interrupt lines 241, 251, 261, 271, which are polled by scanner 332 on a round-robin basis. Thus, it is possible for a particular interrupt to become invalid between a first time it has been polled and the next. Consequently, there is provided combinatorial logic unit 350a, 350b, 350c, 350d coupled between the interrupt request lines 242, 252, 262, 272 and the ISP interfaces 310a, 310b, 310c, 310d with a control line activated by the particular interrupt then being serviced. In one embodiment, combinatorial logic units 350a, 350b, 350c, and 350d comprise multiplexers, but it is to be understood that other types of combinatorial logic circuits may be used. Each combinatorial logic unit 350a, 350b, 350c, 350d returns a signal to its corresponding interface channel when the particular interrupt that is being serviced becomes invalid prior to the ISP interface channel returning the interrupt vector to the ISP.

Upon reception of the combinatorial logic unit's signal indicating deassertion of the interrupt, the appropriate ISP interface 310a, 310b, 310c, 310d sends a spurious interrupt vector to its associated ISP instead of the interrupt vector. The spurious interrupt vector points to a much shorter routine than a regular interrupt vector. For example, a typical interrupt service routine may include ISP instruction to save register state information, read information from a device which initiated the interrupt request, and then determine how to respond to the interrupt request. In contrast, a typical spurious interrupt routine may instruct the ISP to immediately return to the ISP's previous operations. Thus the ISP does not needlessly waste time executing an interrupt routine for an invalid interrupt request. The interrupt request is then cleared and the appropriate ISP interface 310a, 310b, 310c, 310d goes on to the next highest priority interrupt request.

Figure 2:
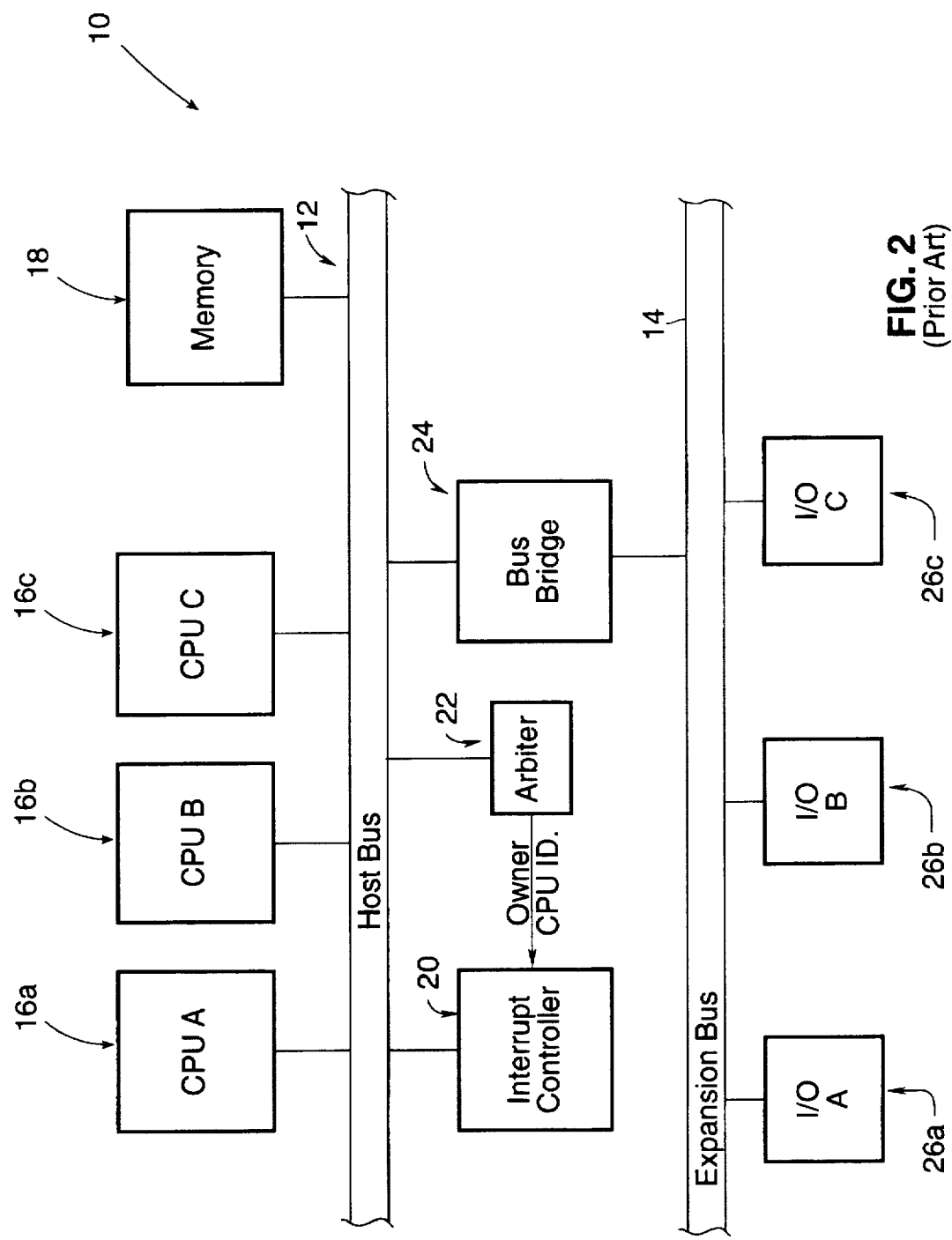
FIG. 2 is a block diagram illustrating a multiprocessing computer system with a programmable interrupt controller according to the prior art.

The source of the interrupt request signals 242, 252, 262, 272 are indicated in FIG. 2 to be I/O devices 250, 260, 270, 280 or bus bridge 240. However, it is noted that in other embodiments, different interrupt request sources may exist. Some of these other sources may be part of the same integrated circuit device in which the programmable interrupt controller 230 is implemented. These sources located within the same integrated circuit are referred to as internal interrupt request sources. One example of such a source is a timer which generates one or more internal interrupt requests according to programmable time out conditions. Also, interrupt requests may come from the ISP interfaces 310a, 310b, 310c, 310d in response to interrupt requests by the corresponding ISP.

Different types of interrupt requests such as those described above may require different handling in the programmable interrupt controller 230. A portion of the unique interrupt identification code may be used to distinguish between different types of interrupt requests for this purpose. For example, in one embodiment, one portion of the unique interrupt identification code may be used to distinguish between interrupt requests from internal and external sources. Another portion may be used to distinguish between interrupts from a timer or from an ISP.

More particularly, the information field stored in memory unit 320 for timer and inter-processor interrupts may differ from the information field for external interrupts. The interrupt information field for such interrupts will include status information for the individual ISPs. For example, the field will indicate whether the interrupt for each receiving ISP is active, dispatched, or acknowledged, as well as the destination, priority, and vector for each interrupt.

The invention described in the above detailed description is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A multiprocessing computer system, comprising:

a plurality of microprocessors coupled to a host bus;

one or more I/O devices coupled to an expansion bus;

a bus bridge coupled between said host bus and said expansion bus; and a programmable interrupt controller coupled to said expansion bus for distributing interrupts from said one or more I/O devices to said plurality of microprocessors;

wherein said programmable interrupt controller includes a plurality of programmable task priority storage locations sharing a common address, wherein each of said plurality of programmable task priority storage locations is associated with a respective one of said plurality of microprocessors; and wherein said bus bridge is configured to receive a write cycle from said host bus to write to one of said plurality of programmable task priority storage locations and to effectuate a corresponding write cycle on said expansion bus, wherein said bus bridge is configured to convey an ID code indicating which of said plurality of microprocessors initiated said write cycle on said host bus.

2. The multiprocessing computer system of claim 1, wherein said programmable interrupt controller is configured to select a particular one of said plurality of programmable task priority storage locations in response to said ID code.

3. The multiprocessing computer system of claim 2, wherein said programmable interrupt controller is configured to store a priority value conveyed as data during said corresponding write cycle on said expansion bus into said particular one of said plurality of programmable task priority storage locations.

4. The multiprocessing computer system of claim 1, wherein said expansion bus is a PCI bus.

5. A method for programming an interrupt controller in a multiprocessor computer system including a plurality of microprocessors coupled to a first bus, a bus bridge which couples said first bus to a second bus, wherein said interrupt controller is coupled to said second bus and includes a configuration storage unit having a plurality of task priority storage locations each corresponding to a separate one of said plurality of microprocessors and each being mapped to a common address, the method comprising:

one of said plurality of microprocessors initiating a write cycle on said first bus to program a new task priority value within said interrupt controller;

said bus bridge receiving said write cycle with said new priority value for said interrupt controller;

said bus bridge effectuating a corresponding write cycle on said second bus;

said interrupt controller receiving said new priority value from said bus bridge during said corresponding write cycle on said second bus;

said interrupt controller receiving an ID corresponding to said one of said plurality of microprocessors which triggered said write cycle on said first bus;

said interrupt controller storing said new priority value in said configuration storage unit corresponding to said one of said plurality of microprocessors in response to said ID received from said bus bridge.

6. The method of claim 5, further comprising:

an I/O device generating a service request;

said interrupt controller receiving said service request;

said interrupt controller establishing a priority for said service request;

said interrupt controller placing said service request in a queue for an available one of said plurality of microprocessors based on a current task priority stored in a respective one of said configuration storage unit.

7. The method of claim 6, further comprising:

said interrupt controller asserting an interrupt request to said available one of said plurality of microprocessors; and said available one of said plurality of microprocessors acknowledging said interrupt request from said interrupt controller;

said interrupt controller providing an interrupt vector to said available one of said plurality of microprocessors; and said available one of said plurality of microprocessors executing a service routine indicated by said interrupt vector.

* * * * *